UNITED STATES PATENT OFFICE.

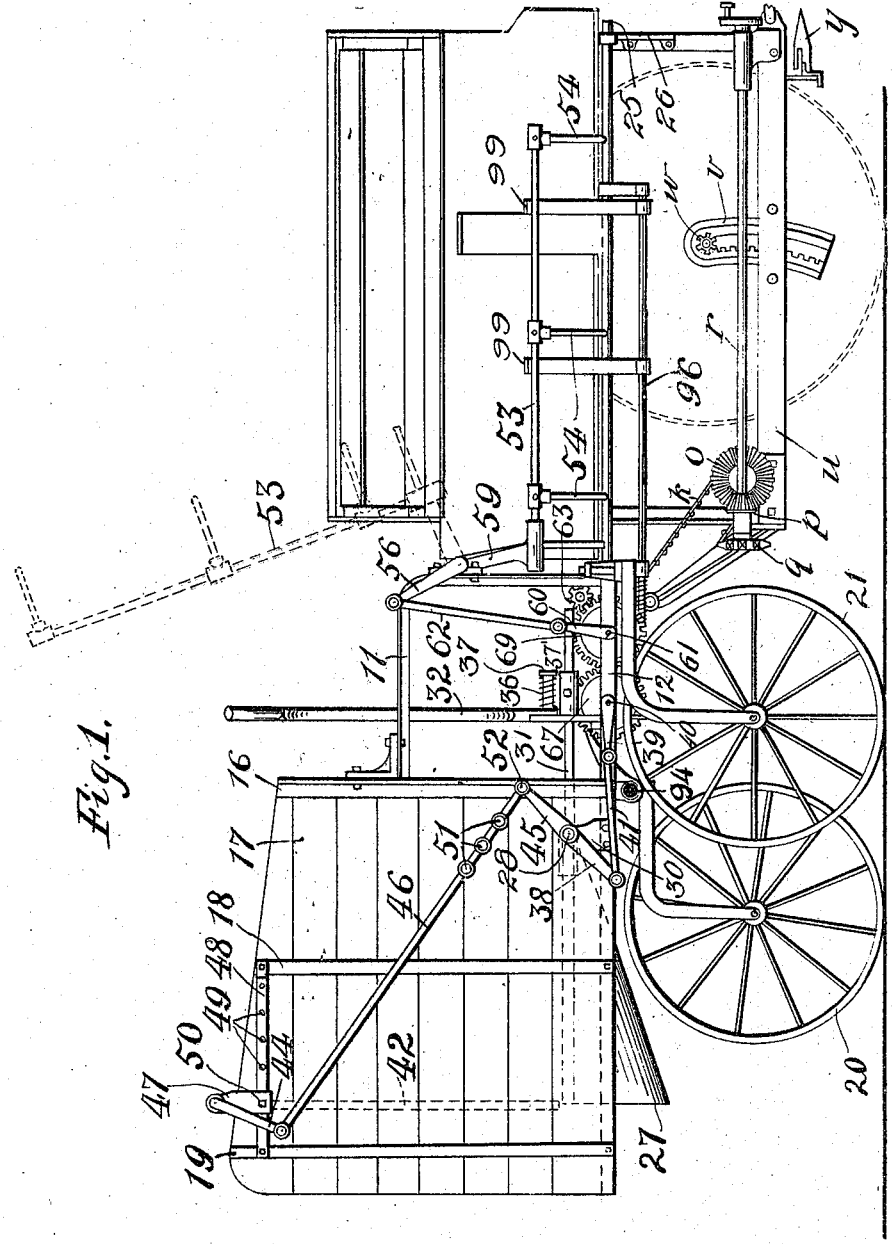

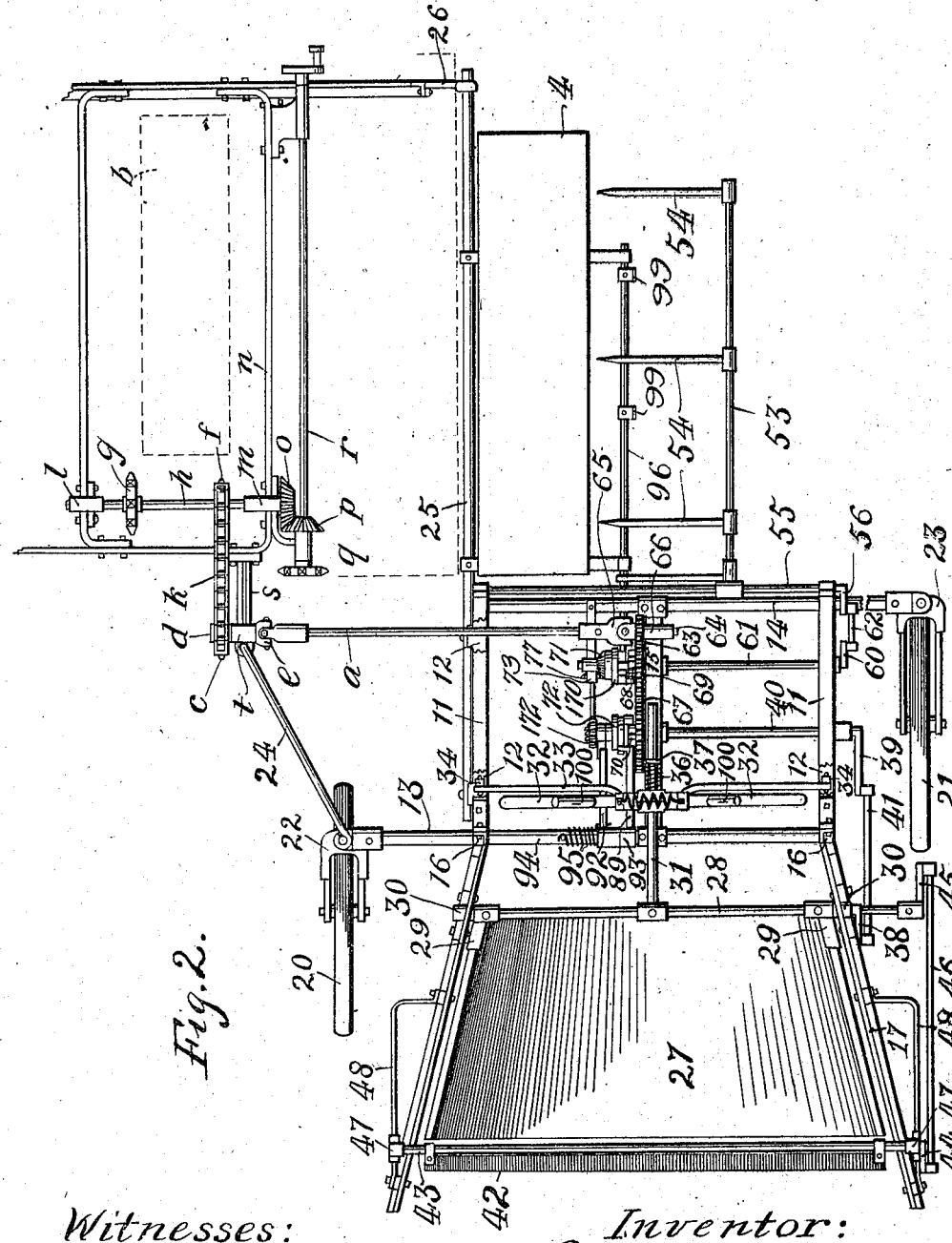

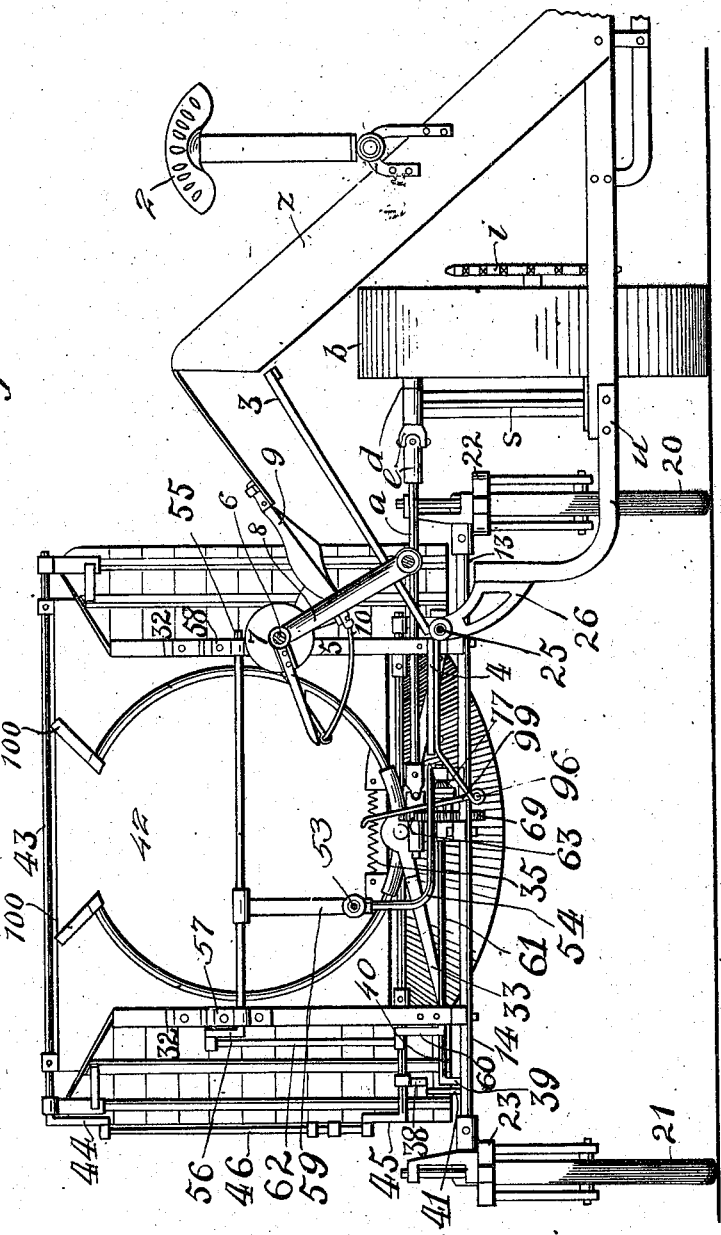

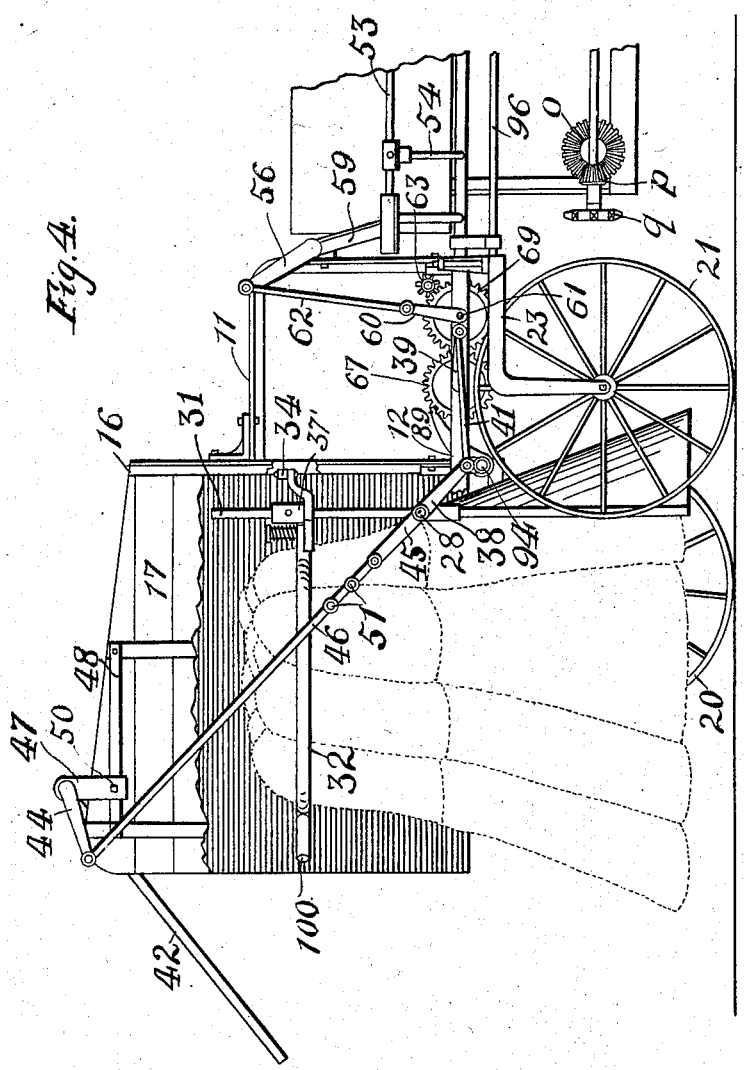

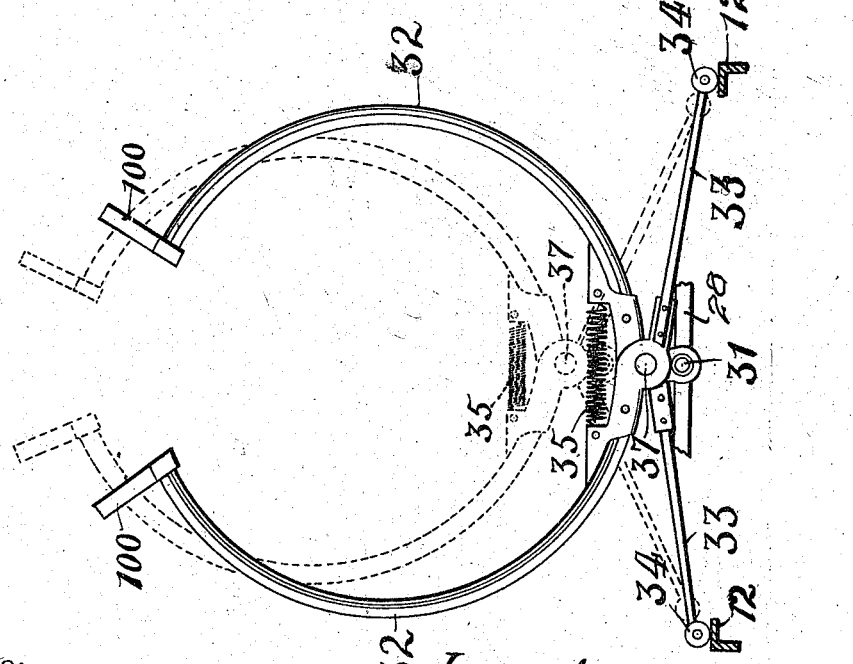

EDWIN M. KELLOGG, OF MOLINE, ILLINOIS.

GRAIN-SHOCKER FOR HARVESTING-MACHINES.

1,170,822. Specification of Letters Patent. Patented Feb. 8, 1916.

Application filed February 7, 1908. Serial No. 414,740.

*To all whom it may concern:*

Be it known that I, EDWIN M. KELLOGG, a citizen of the United States, residing in Moline, in the county of Rock Island and State of Illinois, have invented certain new and useful Improvements in Grain-Shockers for Harvesting-Machines, of which the following is a specification.

This invention relates to that class of grain shockers which are adapted to be attached to a grain harvesting machine such as a self-binder, receive the cut grain from the binder in the form of bundles, automatically deposit the bundles in a suitable shock receptacle or cradle forming a part of the shocker, with butts rearward to form a shock, and deposit the shock in upright position upon the ground automatically and during the movement of the shocker and binder or harvesting machine.

The principal object of the invention is to provide a simple, economical and efficient grain shocker for harvesting machines.

Further objects are to provide a grain shocker adapted to be attached to and preferably operated by a harvesting machine such as a self-binder in such a manner as to receive the bundles from the harvester binder with the butts of the stalks forward and the heads of the grain rearward, automatically reverse the relative positions of the butts and heads of the stalks or bundles and simultaneously deposit each bundle in a suitable shock receptacle to form a shock containing the desired number of bundles or sheaves all with butts rearward, and automatically turn the accumulated bundles to upright position and deposit them in upright position upon the ground with butts slightly spread and heads or tops somewhat compressed so as to form a shock which will remain standing, all during the uninterrupted forward movement of the machine, and by the movement of each bundle from initial to reversed and substantially prostrate position by carrying it through an arc of substantially one hundred and eighty degrees in a circular path in a vertical plane, and then turning all of the bundles forming a shock over a transverse fulcrum in such a manner that the heads move rearward with relation to the machine sufficiently to be without forward momentum when the shock strikes the ground, the movement of the shock being in a circular path in a vertical plane parallel with the direction of movement of the machine. The movement of the bundles, therefore, from the initial position in which they are received from the binder to their final position in the shock is such that the butts of the stalks or bundles, and to all practical purposes the bundles themselves, are carried through or describe substantially an arc of two hundred and seventy degrees in a substantially circular path in a vertical plane parallel with the direction of travel of the machine and in an opposite direction to such travel. The heads of the grain are constantly on the inside of the circular path thus described by the butts. The heads of the grain thus travel a very short distance and with much less momentum than the butts, and the threshing out and wasting of the grain is thus reduced to a minimum. It is also desirable to provide means for compressing the upper portion of the shock or sheaves during the movement thereof to upright position and to the ground, to provide means for determining or controlling the number of bundles in each shock and automatically releasing or permitting the tilting of the shock receptacle, and means for enabling the bundle discharged from the binder to automatically release and permit the automatic operation of the mechanism for carrying the bundles into the shock receptacles.

Other and further objects of the invention will appear from an examination of the drawings and the following description and claims.

The invention consists in the features, combinations of elements and details of construction hereinafter described and claimed.

In the accompanying drawings Figure 1 is a view in side elevation of a grain shocker constructed in accordance with my improvements, showing a portion of a self-binder or harvester with which the shocker is operatively connected; Fig. 2, a plan view of the grain shocker shown in Fig. 1, with parts of the harvester or binder omitted; Fig. 3, a front view in elevation of the shocker, with parts of the harvester or binder, certain parts of the binder mechanism being omitted; Fig. 4, a view in side elevation of the shocker with one side of the shock receptacle partly broken away and showing the titling bottom or cradle in tilted or discharging position and the compressing and shock forming clasp in engagement with the shock—the tail board being in raised position to pass over the shock; Fig. 5, an enlarged view in detail of the shock compressing and forming clasp, showing it in initial or open position in full lines, and in closed or clasping position in broken lines; Fig. 6, a detail view in side elevation of the gears or timing and cradle operating mechanism for operatively connecting the shocker with the harvester or source of power, and for connecting, controlling, operating and releasing the operating parts of the shocker, as seen from the left; Fig. 7, a detail view in side elevation of the clutch mechanism or dog, ratchet and disk shown at the left of Fig. 6, and Fig. 8, a similar view of the clutch mechanism or dog, ratchet, and disk shown at the right of Fig. 6.

In constructing a grain shocker and operatively connecting it with a grain harvesting machine or reaper and binder, in accordance with my improvements, I provide a main operating shaft $a$, (see Figs. 2, and 3,) and operatively connect it with the main or traction wheel $b$ of a harvesting machine or reaper and binder of any desired type. This is accomplished in an efficient manner by means of a sprocket $c$ connected with the shaft $a$ by means of a stub shaft $d$ and universal joint $e$, sprockets $f$ and $g$ on a shaft $h$, sprocket and chain mechanism—not shown—forming a connection between the sprocket $g$ and the traction wheel of the harvester, and a sprocket chain $k$ mounted upon and connecting the sprockets $d$ and $f$. The shaft $h$ may form a part of the harvesting machine proper, and is mounted in suitable bearings $l$ and $m$ in the frame $n$ of the reaper. A bevel gear $o$ on the shaft $h$ and a bevel gear $p$ and sprocket $q$ on the sickle driving shaft $r$ operatively connect the shaft $h$ and thereby the main or traction wheel with the sickle and other working parts of the reaper and binder. A bracket $s$ mounted upon the frame of the harvester or reaper is provided with a suitable bearing $t$ which supports the stub shaft $d$ and thereby the main driving shaft $a$ of the shocker. In order to enable the position and mode of operation of the various parts of the shocker with relation to the reaper to be readily understood the lower portion $u$ of the main frame of the harvester is shown with the supporting quadrant $v$ and spur gear $w$ for adjusting and supporting the main frame upon or with relation to the main traction and supporting wheel $b$ already described. The position of the sickle guard $y$ is shown in Fig. 1, and the position of the upper frame portion $z$, the seat 2, the inclined portion of the grain supporting platform or table 3, the horizontal binding table or board 4, and the rotary bundle discharging arms 5 with their supporting shaft 6, and other parts 7, 8, 9, and 10 of the binder mechanism are all shown in Fig. 3. The other parts of the harvester or reaper and binder are not illustrated or described herein for the reason that it is not deemed necessary in order to enable those skilled in the art to understand and use the invention.

The shocker is provided with a main frame comprising side-frame portions 11 and 12 extending longitudinally of the machine, transverse frame members 13 and 14, a central longitudinal frame member 15 and side uprights 16 all formed preferably of angle iron, and provided with preferably fixed side boards 17 securely braced and held together by means of uprights 18 and 19. The side boards form the sides of a shock receptacle and should extend rearward on opposite sides of the shocker from the main frame portions, and the shock receptacle should be rearward from the bundle carrying and other mechanism of the shocker. In other respects, however, the main frame of the shocker may be of any ordinary and well known form. The form here shown and described, is very economical of construction and efficient in operation and is the preferred form. This frame is mounted upon supporting wheels 20 and 21 in swiveled or vertically pivoted forks or brackets 22 and 23 respectively, the wheel on the inner side or side toward the cutter and standing grain being preferably rearward from the outer wheel, so as to properly balance the load and enable the machine to be backed or turned abruptly in an efficient manner. A brace 24 connects the fork of the inner wheel and the axle or transverse main frame member 13, already described, with the main frame of the harvester, and a main connecting rod 25 forms the principal connection between the shocker and the harvester or reaper, and is mounted in brackets 26 on the main frame of the reaper. A sufficiently flexible connection is thus provided between the shocker and reaper to permit the necessary play of the parts in passing over rough or uneven ground, the connection being sufficiently positive to preserve the required relative positions of the shocker and binder longitudinally and transversely.

The shocker is, as already suggested, provided with a shock receptacle which extends rearward from the bundle carrying and shocker operating mechanism hereinafter described. My preferred form of shock receptacle is shown in the drawings, said receptacle consisting of fixed sides 17 already described and a concave tilting or dumping bottom portion or shock receiving and dumping cradle 27. This dumping bottom or cradle is supported upon a transverse substantially horizontal rotatable rod or shaft 28 secured in fixed relation to the dumping bottom or cradle by means of connecting castings or members 29, and is pivotally mounted in bearings 30 at its opposite ends in the side frames. A transverse fulcrum is thus formed which supports the dumping bottom or cradle and by means of which it is adapted to be tilted or dumped in such a manner as to describe and cause the shock to describe or move along an arc of substantially ninety degrees of a circle in a vertical plane parallel with the direction of travel of the machine. It is very desirable that this be accomplished, as suggested, in such a manner as to cause the heads of the grain to move rearward with relation to the forwardly moving machine, and at a corresponding speed, so that the shock, and particularly the tops of the bundles and shock are substantially without forward momentum at the time the shock comes in contact with the ground, so as to enable the shock to remain standing. It is also desirable to compress the upper portion of the bundles during the time the shock is being dumped and as it strikes the ground, in such a manner as to cause the heads of the bundles to adhere more firmly together and the butts to spread slightly. In order to accomplish this in an efficient manner an arm 31 is secured in fixed relation to the horizontal, transversely extending rotatable shaft 28 which supports the tilting bottom or cradle of the shock receptacle, and upon the forward portion of this arm is mounted a transverse normally upright clasp formed of two curved arms 32 the lower portions of which are crossed and pivotally connected, by means of a pivot pin 37 in the manner of tongs. Each of the arms 32 has a lower arm portion 33 extending on the opposite side of the pivot which connects the arms. These lower arm portions extend transversely across the shocker frame, and is provided with an anti-friction roller 34 on its outer end. When the clasp arms are in spread or extended position—or in other words in normal position—as shown in full lines in Fig. 5, the outer ends of the arms 33, or the anti-friction rollers thereon, engage the side frame members 12, or similar stops, which hold the clasp arms in spread or extended position against the tension of a spring 35 which is connected at its opposite ends to said arms 32 respectively. When the shock is in process of being formed the arms are spread, and when the tilting cradle or bottom of the shock receptacle is tilted to discharging position, as shown in Fig. 4, the clasp moves with it, and as the outer ends of the arms 33 are swung inward by the action of the spring 35 and the clasp swung away from the stops or side frame members 12 the arms 32 are caused to swing toward each other and tightly clasp and compress the upper portion of the sheaves or bundles in the shock receptacle during the movement of the shock from prostrate to upright position and from the shocker to the ground.

Upon again coming into contact with the side frame members 12 or with bosses adapted to spread them the arms will be again spread. The upper ends of the arms 32 are at all times preferably out of engagement with each other and, when in spread position are sufficiently far apart to permit bundles or sheaves of the desired size to pass therebetween. As shown in Figs. 4 and 5, both of the clasp arms 32 are pivotally mounted on the headed pivot pin 37. The headed pivot pin 37 is mounted upon a bracket or sleeve 37', which sleeve is secured to the rod 31. (See Fig. 4.) On this pin 37 is a spring 36 which engages one of the clasp arms and the head of the pivot pin and is adapted to hold the clasp arms yieldingly together without unnecessary binding.

In order to provide means for tilting the shock receptacle bottom or cradle the shaft 28 is provided with a crank 38 which is connected with a similar crank 39 upon a rotatable shaft 40, by means of a connecting rod or pitman 41, in such a manner that the rocking or partial rotation of the shaft 40 will tilt the bottom and cause or permit it to move to the position shown in Fig. 4, from the position shown in Fig. 1. A rear end gate or tail piece 42 is pivotally mounted at the rear of the shock receptacle and cradle or tilting bottom upon a transverse rotatable rod 43 having a crank 44 on one end thereof connected with a crank 45 on the tilting shaft 28 by means of a connecting rod 46. To enable the tail piece or end gate 42 to be adjusted forward or back to accommodate it to the different lengths of sheaves, when necessary, the rod 43 already described, is mounted in adjustable bearings 47 which are mounted upon supporting rods 48 extending longitudinally of the shocker on opposite sides thereof, and these bearings and rods are provided with perforations 49 and 50 respectively, adapted to receive a bolt for holding the bearing blocks 47 in the desired adjusted position. The rod 46 is also provided with a plurality of perforations 51 arranged at suitable intervals for receiving the crank pin 52. By this arrangement the rotation of the tilting or cradle operating shaft 28 in the direction necessary to discharge or drop the shock will cause the tail piece to swing rearward and upward into position to permit the passage of the shock to the ground, and to permit the passage of the tail piece over the shock when the latter is on the ground. The rotation of the shaft and cradle back to normal position will, as a matter of course bring the tail piece back to normal position and hold it there in position to hold the butt ends of the sheaves even with each other as the shock is being formed. The tilting bottom or cradle is made of flexible material so as to sag in the middle, and with the curved clasp arms cause the shock to become as nearly round as possible. It is also widest at the end containing the butts, so as to permit them to spread and form a shock of greater diameter at the bottom than at the top or point where it is engaged by the clasp. The gear and clutch mechanism for operating the shafts 40 and 28 will be described in connection with the mechanism for operating the bundle carrier or sheaf receiving and handling mechanism for receiving the bundles and inverting and depositing them in the shock receptacle.

The mechanism for receiving the sheaves or bundles from the binder butts foremost, reversing the positions of the butts and depositing the bundles in the shock receptacle, and for permitting or causing the operation of the tilting mechanism above described at the proper intervals and in the required manner, is constructed as follows: A bundle carrier and inverter in the form of an arm or cradle 53 and having transverse portions or arms 54 extends along beside and adjacent to the discharge edge of the binder table with its bundle receiving portion below the level of the bundle discharging arms 5, of the binder mechanism, in position to receive the bundles successively as they are discharged from the binder or binder table. This cradle, when in initial or normal position extends longitudinally of the machine, in a substantially horizontal plane and forward of the shock receptacle above described, preferably in line with the longitudinal center of the shock receptacle, as shown in Figs. 2 and 3. Its rear end is pivotally supported by means of a transversely extending rotatable rod or shaft 55 which has a crank 56 for operating it. This rod is rotatably mounted in suitable bearings at its opposite ends which bearings are indicated by the reference numerals 57 and 58 and form a transverse fulcrum over or upon which the cradle is adapted to be tilted or rocked. The lower forward portion of the cradle 53 is secured in fixed relation to the rod 55 by means of a depending arm portion 59 so that the shock receiving and containing portion of the cradle is normally below the level of the fulcrum or pivotal point about which it swings in a vertical plane. The crank 56 is connected with the crank 60 upon a rotatable cradle operating shaft 61 by means of a connecting rod 62, thereby operatively connecting the shaft 61 with the cradle 53.

In operation it is desirable that the transverse cradle-tilting or operating shafts 40 and 61 be so connected with the main operating shaft $a$ of the shocker, and so operatively connected with each other that the shaft $a$ may be kept in constant rotation by the main or traction wheel of the harvester when in operation, the shaft 61 caused to rotate or operate once for each operation of the bundle lifter or cradle 53, or once for each bundle deposited in the shock receptacle, and the shaft 40 once for each shock formed and deposited upon the ground by the shock receptacle. The operations of the shaft 61 and the forward cradle or bundle lifter and inverter should be automatic, and should be caused to take place immediately following and preferably as a result of the depositing of each bundle respectively upon the cradle or bundle lifter 53 by the discharge arms of the binder. The operations of the shaft 40 and the tilting of the cradle and clasp of the shock receptacle should take place once for each shock and during the interval when the first bundle of the next succeeding shock is being formed, and while the shaft 61 is stationary or in the act of returning with the cradle 53 to initial or normal position. It is also desirable, as already suggested that the tilting of both cradles be accomplished in such a manner that but one operating shaft will be required for rotating both of the crank shafts 40 and 61, and so that the tilting of the shock receiving cradle will be produced automatically and whenever the desired number of bundles have been deposited in the shock receptacle to form a shock. In order to provide means for accomplishing these objects in an efficient manner, a spur gear 63 is mounted upon and in fixed relation to a stub shaft 64, said stub shaft being flexibly connected with the shaft $a$ by means of a universal joint 65 and journaled in a suitable bearing 66 in the frame of the shocker. A spur gear 67 having a ratchet 68 in fixed relation thereto and preferably integral therewith is loosely mounted upon the shaft 61, and a similar spur gear 69 having a ratchet wheel 70 in fixed relation to and preferably integral with said last mentioned gear is loosely mounted upon the shaft 40. The gears 67 and 69 are in toothed engagement with each other and the gear 67 is in toothed engagement with the gear or pinion 63. A hub or disk 170 is mounted upon and in fixed relation to the shaft 61, and a bevel gear 71 is mounted in fixed relation to and upon the outside of said hub or disk, thus being also upon and in fixed relation to the shaft. A hub or disk 72 is mounted upon and in fixed relation to the shaft 40, and worm wheel 172 having preferably one tooth for each bundle to be contained in each shock, is loosely mounted upon the shaft 40, on the outside of the hub 72. A supporting frame 73 having a forwardly extending portion 74 and a rearwardly extending sleeve portion 75 supported by the shaft 61 and the frame of the machine is provided with a shaft 76 rotatably mounted in said frame. A beveled pinion 77 on one end of this shaft is in toothed engagement with the pinion or gear 71, and a worm 78 on the opposite end of the same shaft is in toothed engagement with the worm wheel 172. A dog 79 is pivotally mounted upon the hub 170 to which it is pivotally secured by means of a pivot pin 80. One end of this dog is provided with a projecting pin or roller 81 forming a detent which is adapted to engage the ratchet 68 when the dog is released and pressed into engaging position by a spring 82. One end of this compressible spring is in engagement with the dog and the opposite end is in engagement with a projection or boss 83, which is preferably upon the hub 170. A similar trip dog 84 is pivotally mounted upon the hub or disk 72 which is in fixed engagement with the shaft 40, said dog being pivotally secured in position by a pivot pin 85, and being provided with a projection or roller 86 on one end of the dog which is adapted to engage the teeth of the ratchet 70 when the dog is released. A spring 87 has one end in engagement with this dog and the opposite end in engagement with a projection or boss 88 which is preferably upon the hub or disk 72.

A trip stop or lever consisting of a stop arm 89 provided with a projecting or hooked end portion 90 which is adapted to engage a shoulder 91 on the dog 84, and having a trip arm 92 connected with the arm 89 by means of a sleeve 93 and all forming a double armed trip stop, is pivotally mounted upon a shaft or rod 94, and yieldingly held in position by means of a spring 95. A trip arm 196 upon and in fixed relation to the worm wheel 172 is adapted to engage the end of the arm 92 once for each rotation of the worm wheel thus throwing the stop 90 out of engagement with the dog 84 and causing the latter to engage the ratchet 70 which is in fixed relation to the gear wheel 69. (See Fig. 6.) This it will be readily seen, causes the said gear and the shaft 40 to rotate together until the dog 84 is thrown out of engaging position by again coming into contact with the stop 90 which releases the clutch. The gear wheel 67 and the shaft 61 are operatively connected and disconnected in a similar manner by means of the dog 79 engaging the ratchet 68 when said dog 79 is released from engagement with the trip shaft 96. This trip shaft 96 is provided with a laterally projecting end portion or stop 97 which normally engages the shoulder 98 on the dog 79. The opposite or forward end of the shaft 96 is provided with trip arms or triggers 99 which extend upward and outward transversely adjacent to or between the arms 54 of the cradle 53 in position to be engaged by each bundle or sheaf of grain discharged from the binder. (See Figs. 1, 2 and 3.) The arms 5 and the discharged bundle release the cradle by the pressure of the bundle against the trigger or trip arms 99 which are in fixed relation to the rotatable trip shaft 96 causing the latter to rotate a sufficient distance to release the dog 79 from engagement with the stop 97 upon the trip shaft, thus automatically releasing and permitting the rotation of the shaft 61 and permitting the engagement of the dog and ratchet or clutch mechanism between the gear wheel 67 and the shaft 61 in a manner similar to that already described in connection with the rear cradle-operating shaft 40. The rotation of the shaft 61 with the crank arm 60 also serves to raise the bundle-lifting cradle 53.

In operation each sheaf or bundle of grain is cut and bound by the harvester and discharged by the bundle discharging mechanism of the binder onto the bundle lifting cradle 53 of the shocker. In passing onto the said cradle the bundle strikes the trip lever or trigger 99 thereby turning the trip shaft 96 so that its stop 97 releases the dog 79. The dog is thus permitted to be pressed into engagement with the ratchet 68 on the gear wheel 67 which is kept in constant rotation by the spur pinion or gear 63 and the main traction wheel of the harvester with which it is connected. The shaft 61 is thus caused to make a complete rotation thereby causing the pivoted cradle 53 to move upward and rearward in a circular path in a vertical plane parallel with the direction of movement of the shocker and harvester and parallel with the longitudinal center of the bundle or sheaf upon said cradle, thereby longitudinally inverting or turning the bundle end for end and lifting or carrying it from prostrate position with butt end forward to prostrate position with butt end rearward, in the rearwardly tilting or dumping portion of the shock receiving and shock forming receptacle. The sheaves or bundles in falling into the shock receptacle pass between the open ends of the arms 32 of the clasp, and the ends of these arms are provided with upwardly and outwardly inclined portions 100 which act in the manner of a hopper to guide the bundles into position inside of the clasp and rear downwardly movable dumping portion of the shock receptacle which is in rigid relation to the clasp. The operation of the bundle lifting or forward cradle is continued until the required number of bundles are deposited butt ends rearward in the shock receptacle to form a shock, and the gear, clutch or dog and ratchet mechanism and tripping mechanism described and operating in connection with the shaft 40 is then automatically set in operation to dump the receptacle and thereby the shock contained therein to upright position upon the ground. Each bundle is thus caused to travel through an arc of one hundred and eighty degrees of a circle in a vertical plane from prostrate position with butt end forward as received from the binder, to prostrate position with butt end rearward in the prostrate shock, and all of the bundles forming the shock are caused to turn from prostrate to upright position upon the ground through an rc of ninety degrees in a vertical plane parallel with the direction of movement of the machine, the upper portion of the shock being at the same time compressed and the butts slightly expanded by the action of the clasp as already described. The bundles therefore are inverted longitudinally or turned end for end and to upright position upon the ground, from prostrate position in which they are discharged from the binder by being turned in a circular path in a vertical plane through the arc of two hundred and seventy degrees of a circle, and in an opposite direction to the direction of movement of the machine.

I claim:—

1. In a machine of the class described, the combination of a harvesting machine provided with a traction wheel, a rearwardly tilting shock receptacle, a transverse pivot for the shock receptacle, a pivoted, reciprocating, bundle-lifting member located forward of said transverse pivot and of the shock receptacle and having a bundle-engaging and supporting portion movable upward and rearward in a plane at right angles to the transverse axis of the shock receptacle and toward the shock receptacle, means for reciprocating the bundle-lifting cradle, and operating mechanism connected with said shock receptacle and operatively connected with the traction wheel for automatically operating the shock receptacle.

2. In a machine of the class described, the combination of a harvesting machine having a main traction wheel and having a grain binder provided with bundle-discharging mechanism, a rearwardly tilting shock receptacle, a transverse pivot for the shock receptacle, a pivoted reciprocating bundle-lifting member located on the stubbleward side of the path of movement of the main traction wheel and adjacent to the bundle-discharging arms of the grain binder and forward of said transverse pivot of the shock receptacle, and having a bundle-engaging and supporting portion movable upward and rearward toward the shock receptacle in a plane substantially at right angles to the transverse axis of the shock receptacle, a rock shaft in supporting engagement with the reciprocating bundle-lifting member, actuating mechanism connected with said rock shaft, and actuating mechanism connected with the tilting shock receptacle and operatively connected with the main traction wheel, for automatically operating said shock receptacle.

3. In a machine of the class described, the combination of a main frame, supporting wheels upon which the frame is mounted, a rearwardly tilting shock receptacle mounted in the frame, a pivoted reciprocating cradle mounted in the frame forward of the rearwardly tilting shock receptacle, and adapted to receive bundles of grain from a binder, mechanism operatively connected with the reciprocating cradle and with the rearwardly tilting shock receptacle and forming a connection between said cradle and shock receptacle, for automatically operating the shock receptacle, and means for operating the reciprocating cradle.

4. In a machine of the class described, the combination of a shocker frame, a rearwardly tilting shock receptacle pivotally mounted in the frame, dumping mechanism operatively connected with the shock receptacle for tilting it, a reciprocating bundle-lifting cradle pivotally mounted forward of the shock receptacle and having its free end normally located forward with respect to its axis and adapted to swing upward and rearward above the level of its axis, in the direction of the shock receptacle and in supporting engagement with the bundle, cradle-operating mechanism operatively connected with the reciprocating bundle-lifting cradle, and automatically actuated trip and dog mechanism operatively connected with the dumping mechanism of the shock receptacle.

5. In a machine of the class described, the combination of a harvesting machine provided with binder mechanism having bundle-discharging arms, a shocker frame connected with the harvesting machine, a rearwardly tilting shock-engaging member mounted in the shocker frame, actuating mechanism connected with said tilting member, a pivoted reciprocating bundle-lifting arm movable upward and rearward toward said tilting shock-engaging member and adapted to receive a bundle from said discharging arms of the harvesting machine, actuating mechanism operatively connected with the pivoted bundle-lifting receptacle, and releasing mechanism operatively connected with the actuating mechanism of the reciprocating bundle-lifting arm and adapted to be engaged and operated by a discharged bundle of the binder.

6. In a machine of the class described, the combination of a harvesting machine provided with binder mechanism and having bundle-discharging arms, a shocker frame connected with the harvesting machine, a rearwardly tilting shock-engaging member mounted in the shocker frame, actuating mechanism connected with said tilting member, a reciprocating bundle-lifting arm pivotally mounted forward of the tilting shock-engaging member, adapted to receive a bundle from said discharging arms, actuating mechanism for operating the bundle-lifting arm, and releasing mechanism operatively connected with the actuating mechanism of the bundle-lifting arm and adapted to be engaged and operated by a discharged bundle.

7. In a machine of the class described, the combination of a frame, a rearwardly tilting shock receptacle pivotally supported upon a horizontal axis, a reciprocating bundle-lifting cradle pivotally mounted upon a transverse axis and forward of said shock receptacle and having a bundle-engaging portion adapted to swing upward and rearward above the level of its axis and in supporting engagement with the bundle, for depositing bundles in the shock receptacle butt ends rearward, and mechanism operatively connected with both the reciprocating bundle-lifting cradle and the shock receptacle and forming a connection between said cradle and said shock receptacle for tilting the shock receptacle and cradle in predetermined order.

8. In a machine of the class described, the combination of a frame, a rearwardly tilting shock receptacle pivotally supported upon a horizontal axis, a reciprocating bundle-lifting cradle pivotally mounted upon a transverse axis and forward of said shock receptacle and adapted to swing upward and rearward above the level of its axis and in supporting engagement with the bundle toward the shock receptacle, for depositing bundles in the shock receptacle butt ends rearward, means for delivering bundles to the bundle-lifting cradle, and shaft and gear mechanism operatively connected with the shock receptacle and bundle-lifting cradle and forming a connection between said shock receptacle and said cradle, for operating the bundle-lifting cradle and dumping shock receptacle in predetermined order.

9. In a machine of the class described, the combination of a frame, a rearwardly tilting pivoted shock receptacle supported by the frame, a reciprocating bundle-lifting cradle pivotally mounted upon a transverse axis and forward of said shock receptacle and adapted to swing upward and rearward over its axis and in supporting engagement with the bundle, a harvesting machine provided with binder and bundle-discharging mechanism, actuating mechanism operatively connected with the bundle-lifting cradle and the rearwardly dumping shock receptacle, respectively, for operating the same, and tripping mechanism operatively connected with said actuating mechanism and located adjacent to the bundle-discharging mechanism in position to be engaged and operated by a discharged bundle.

10. In a machine of the class described, the combination of a frame, a rearwardly tilting pivoted shock-supporting member supported by the frame, a reciprocating bundle-lifting cradle pivotally mounted upon a transverse axis and forward of said rearwardly tilting shock-supporting member, and having a bundle-engaging portion adapted to swing upward and rearward above the level of its axis and in engagement with a bundle, a harvesting machine provided with binder and bundle-discharging mechanism, actuating mechanism operatively connected with the tilting pivoted shock-supporting member and operatively connected with and adapted to be driven by a movable part of the harvester, actuating mechanism operatively connected with the pivoted bundle-lifting cradle, and tripping mechanism operatively connected with the actuating mechanism of the bundle-lifting cradle and arranged in position to be engaged and operated by a discharged bundle located intermediate the tripping mechanism and the bundle-discharging arms of the harvester.

11. In a machine of the class described, the combination of a harvesting machine having a traction wheel, and provided with binder mechanism, a rearwardly tilting shock receptacle connected with the harvesting machine, a reciprocating bundle-lifting member pivotally mounted upon a transverse axis and forward of said shock receptacle and adapted to swing upward and rearward above the level of its axis, for depositing bundles in the dumping shock receptacle, and mechanism operatively connected with the traction wheel and with the bundle-lifting member and the dumping shock receptacle, for operating the bundle-lifting member and the shock receptacle in predetermined order.

12. In a machine of the class described, the combination of a frame, a rearwardly tilting shock receptacle supported by the frame, an upwardly and rearwardly movable reciprocating bundle lifting cradle located forward of the shock receptacle, a transverse rock shaft upon which said cradle is mounted, operating mechanism connected with the rock shaft, for reciprocating it and thereby reciprocating the cradle, mechanism connected with the shock receptacle, for operating it, to carry the shock to upright position, and means for operatively connecting the bundle-lifting cradle with the shock receptacle operating mechanism.

13. In a machine of the class described, the combination of a supporting frame, a rearwardly tilting shock receptacle supported by the frame, an upwardly and rearwardly movable reciprocating bundle-lifting member located forward of the rearwardly tilting shock receptacle, a transverse rock shaft upon which said bundle-lifting member is mounted, gear mechanism operatively connected with the rearwardly tilting shock receptacle for operating the same, and actuating mechanism operatively connected with said gear mechanism and with said transverse rock shaft of the bundle-lifting member for actuating said gear mechanism and rock shaft.

14. In a machine of the class described, the combination of a frame, a rearwardly tilting shock receptacle pivotally supported by the frame, shaft and gear mechanism connected with the shock receptacle and adapted to be connected with a source of power for operating said receptacle, a reciprocating bundle-lifting cradle located forward of the dumping shock receptacle, a transverse rock shaft upon which said cradle is mounted, gear mechanism connected with the rock shaft, for reciprocating the same and thereby the bundle-lifting cradle, and tripping mechanism for connecting the shock receptacle with its source of power operatively connected with the cradle-operating gear mechanism.

15. In a machine of the class described, the combination of a frame, a rearwardly tilting shock receptacle supported by the frame, gear mechanism connected with the shock receptacle for operating the same to carry the shock to upright position, tripping mechanism operatively connected with said gear mechanism, a traction wheel, means for connecting said gear mechanism with the traction wheel, a reciprocating bundle-lifting cradle, located forward of the shock receptacle for depositing bundles therein, a transverse rock shaft upon which said cradle is mounted, gear mechanism connected with the rock shaft for operating it and thereby the reciprocating bundle-lifting cradle, and actuating mechanism operatively connected with the traction wheel and with the cradle-operating gear mechanism for operating said gear mechanism and thereby the bundle-lifting cradle.

16. In a machine of the class described, the combination of a frame, a rearwardly dumping shock receptacle supported by the frame, a crank shaft, means for connecting the crank shaft with the shock receptacle, a gear on said crank shaft, a bundle-lifting cradle located forward of the shock receptacle, a rock shaft connected with the bundle-lifting cradle, a rotary shaft connected with said rock shaft, for operating the cradle, and gear mechanism operatively connected with the last mentioned rotary shaft and in toothed engagement with said gear on said crank shaft.

17. In a machine of the class described, the combination of a frame, a rearwardly dumping shock receptacle supported by the frame, a crank shaft, means for connecting the crank shaft with the dumping shock receptacle, a pivoted bundle-lifting cradle for depositing bundles in the shock receptacle, a traction wheel and shaft and gear mechanism connected with the bundle-lifting cradle and said crank shaft, respectively, and with said traction wheel, for operating the bundle-lifting cradle and rearwardly dumping shock receptacle.

18. In a machine of the class described, the combination of a frame, a rearwardly dumping shock receptacle supported by the frame, a crank shaft connected with the shock receptacle, a pivoted bundle-lifting cradle for depositing bundles in the shock receptacle, a second crank shaft connected with the bundle-lifting cradle, a traction wheel, gear mechanism operatively connected with the traction wheel, and means for connecting the gear mechanism with said crank shaft.

19. In a machine of the class described, the combination of a frame, a rearwardly dumping shock receptacle supported by the frame, a bundle-lifting cradle for depositing bundles in the shock receptacle, a crank shaft connected with the shock receptacle, a shaft connected with the bundle-lifting cradle, a traction wheel, gear mechanism connected with the traction wheel, and means for connecting the gear mechanism with said shafts, respectively, in predetermined order.

20. In a machine of the class described, the combination of a frame, a rearwardly tilting shock receptacle supported by the frame, a pivoted reciprocating bundle-lifting cradle for depositing bundles in the shock receptacle, a shaft journaled in suitable bearings and connected with the shock receptacle, a shaft journaled in suitable bearings and connected with the bundle-lifting cradle, a traction wheel, gear mechanism operatively connected with the traction wheel, and with said shafts, and thereby with said shock receptacle and bundle-lifting cradle, and actuating mechanism operatively connected with said gear mechanism.

21. In a machine of the class described, the combination of a frame, a dumping shock receptacle supported by the frame, a bundle-lifting cradle for depositing bundles in the dumping shock receptacle, a rotary shaft connected with the shock receptacle, a rotary shaft in parallel relation to the first mentioned shaft and connected with the bundle-lifting cradle, a traction wheel, gear mechanism comprising a plurality of gear wheels each loosely mounted upon one of said shafts and in toothed engagement with each other, means for operatively connecting said gear mechanism with the traction wheel, and means for connecting each of said gear wheels with the shaft upon which it is mounted.

22. In a machine of the class described, the combination of a frame, a rearwardly tilting pivoted shock supporting member supported by the frame, a reciprocating bundle-lifting cradle for depositing bundles in the tilting pivoted shock-supporting member, a rotary shaft connected with the tilting shock-supporting member, a rotary shaft connected with the bundle-lifting cradle, a traction wheel, a shaft connected with the traction wheel and adapted to be rotated thereby, gear mechanism operatively connected with the last mentioned shaft, dog and ratchet mechanism for connecting the gear mechanism with the two first mentioned shafts, respectively, and means for connecting and releasing the dog and ratchet mechanism.

23. In a machine of the class described, the combination of a frame, a rearwardly tilting dumping shock receptacle supported by the frame, a reciprocating bundle-lifting cradle for depositing bundles in the shock receptacle, a rotary shaft connected with the shock receptacle for operating the same, a rotary shaft connected with the bundle-lifting cradle for operating the latter, gear mechanism comprising gear wheels loosely mounted on each of said shafts, respectively, a traction wheel, means for connecting the gear mechanism with the traction wheel, dog and ratchet mechanism for connecting the gear mechanism with said rotary shafts, respectively, and releasing mechanism operatively connected with the dog and ratchet mechanism.

24. In a machine of the class described, the combination of a grain harvesting machine having a traction wheel and comprising binder mechanism having bundle-discharging arms, a rearwardly-tilting, pivoted shock receptacle connected with the harvesting machine, a pivoted reciprocating, bundle-lifting cradle located forward of the shock receptacle normally adjacent to the bundle-discharging arms of the harvester binder, cradle-operating mechanism connected with the traction wheel and acting to swing the reciprocating cradle upward and rearward toward the shock receptacle while the cradle is in supporting engagement with bundles of grain to be deposited in the shock receptacle, means for automatically connecting the cradle with and disconnecting it from said cradle-operating mechanism, and actuating mechanism operatively connected with said tilting shock receptacle and operatively connected with and adapted to be driven by a movable part of the harvester for operating the rearwardly dumping shock receptacle.

25. In a machine of the class described, the combination of a grain harvesting machine having a traction wheel, and comprising binder mechanism having bundle-discharging arms, a rearwardly dumping shock receptacle connected with the harvesting machine, a pivoted reciprocating bundle-lifting cradle located forward of the shock receptacle, shock receptacle-operating mechanism connected with the traction wheel, and means for automatically connecting the bundle-lifting cradle with the shock receptacle-operating mechanism and disconnecting it therefrom.

26. In a machine of the class described, the combination of a grain harvesting machine comprising a main frame, a traction wheel, binder mechanism and bundle-discharging mechanism, a shocker frame provided with supporting wheels, a pivoted rearwardly tilting shock receptacle mounted in the shocker frame, a pivoted, reciprocating, bundle-lifting cradle mounted forward of the shock receptacle and movable upward and rearward toward the latter, and adapted to receive bundles of grain from the bundle-discharging mechanism of the harvesting machine and deposit them in the shock receptacle, actuating mechanism operatively connected with said tilting shock receptacle and cradle and operatively connected with and adapted to be driven by a movable part of the harvester for automatically operating the pivoted cradle and the rearwardly dumping shock receptacle in predetermined order, and means for flexibly connecting the shocker frame with the main frame of the harvesting machine.

27. In a machine of the class described, the combination of a pivoted shock receptacle, a bundle-lifting member located forward of the shock receptacle, for depositing bundles in the latter, a transverse rock shaft upon which said bundle-lifting member is mounted, a tail piece hinged adjacent to and extending across the rear end of the shock receptacle, and means for operating the bundle-lifting cradle, the shock receptacle, and the tail piece in predetermined order.

28. In a machine of the class described, the combination of a pivoted rearwardly dumping shock receptacle, a bundle-lifting cradle located forward of the shock receptacle, a transverse rock shaft upon which said cradle is mounted, for depositing bundles in the latter, a tail piece mounted adjacent to and extending transversely with respect to the rear end of the shock receptacle, means for operating the bundle-lifting cradle and the pivoted shock receptacle, respectively, and means for automatically swinging the tail piece upward and rearward with respect to the pivoted shock receptacle.

29. In a shocking machine, a frame, a rearwardly dumping sheaf receiving cradle supported thereby, an upwardly and rearwardly movable sheaf delivering member located forward of the sheaf receiving cradle, and cradle actuating mechanism operatively connected with said cradle and said sheaf delivering member, respectively.

30. In a shocking machine, a frame, a sheaf receiving cradle supported thereby, an upwardly and rearwardly movable sheaf delivering member located forward thereof on said frame, mechanism connected with said cradle for tilting the same to upright position, and means for connecting the sheaf delivering member with the sheaf receiving cradle operating mechanism.

31. In a shocking machine, a frame, a rearwardly dumping sheaf receiving cradle supported thereby, a pivoted sheaf delivering member for depositing sheaves in said cradle, shaft and gear mechanism operatively connected with the pivoted delivery member and cradle respectively for operating the same, and means for automatically actuating the shaft and gear mechanism and thereby the cradle and delivery member.

32. In a shocking machine, a frame, a rearwardly dumping sheaf receiving member supported thereby, gear mechanism connected with said member for tilting the same to upright position, a sheaf delivering member pivotally mounted on said frame forward of the sheaf receiving member for depositing sheaves therein, tripping mechanism operatively connected with said gear mechanism and connectible with said delivering member, and means for operating the sheaf receiving member.

33. In a shocking machine, a frame, a dumping sheaf receiving cradle supported thereby, a sheaf delivering member for depositing sheaves in said cradle, a shaft journaled in suitable bearings and connected with said cradle, a shaft journaled in suitable bearings and connected with said sheaf delivering member, a traction wheel, gear mechanism operatively connected with said wheel, and tripping mechanism operatively connected with said gear mechanism and connectible with said shafts respectively.

EDWIN M. KELLOGG.

Witnesses:
HARRY IRWIN CROMER,
NELLIE E. GEORGE.